United States Patent
Teuchert et al.

(12)
(10) Patent No.: US 6,441,957 B1
(45) Date of Patent: Aug. 27, 2002

(54) DIRECTIONALLY ADJUSTABLE TELESCOPE ARRANGEMENT

(75) Inventors: Wolf-Dieter Teuchert, Königsbronn; Karl-Heinz Hager, Heidenheim; Rolf Sand, Oberkochen, all of (DE)

(73) Assignee: Zeiss Optronik GmbH, Oberkochen (DE)

( * ) Notice: Subject to any disclaimer, the term of this patent is extended or adjusted under 35 U.S.C. 154(b) by 0 days.

(21) Appl. No.: 09/497,256

(22) Filed: Feb. 3, 2000

(30) Foreign Application Priority Data

Feb. 5, 1999 (DE) .......................... 199 04 687

(51) Int. Cl.[7] .................. G02B 17/00; G02B 21/00; G02B 23/00
(52) U.S. Cl. .................. 359/364; 359/366; 359/429; 359/731; 359/859
(58) Field of Search ................. 359/364, 365, 359/366, 399, 429, 729, 731, 858, 859

(56) References Cited

U.S. PATENT DOCUMENTS

| 4,993,818 A | * | 2/1991 | Cook ..................... 359/366 |
| 5,309,276 A | | 5/1994 | Rodgers |
| 5,379,157 A | | 1/1995 | Wang |
| 5,661,610 A | * | 8/1997 | Pasternak ............... 359/859 |
| 6,020,994 A | * | 2/2000 | Cook ..................... 359/365 |

FOREIGN PATENT DOCUMENTS

| EP | 0385079 | 9/1990 |
| EP | 0601871 | 6/1994 |
| EP | 0863421 | 9/1998 |

* cited by examiner

*Primary Examiner*—Mark A. Robinson
(74) *Attorney, Agent, or Firm*—Walter Ottesen

(57) ABSTRACT

The invention is directed to a directionally adjustable telescope arrangement (1) having a first arcuate mirror (3), a second arcuate mirror (9) and a planar deflecting mirror (13). A third arcuate mirror (17) is provided in the imaging beam path of the telescope arrangement (1). The mirror (17) coacts with the first arcuate mirror (3) and the second arcuate mirror (9) to effectively form images.

4 Claims, 7 Drawing Sheets

DIRECTIONALLY ADJUSTABLE TELESCOPE ARRANGEMENT

FIELD OF THE INVENTION

The invention relates to a directionally adjustable telescope arrangement having a first arcuate mirror, a second arcuate mirror and a planar deflection mirror.

BACKGROUND OF THE INVENTION

A directionally adjustable telescope arrangement of the above kind is especially suitable for a stabilized aerial image camera or a reconnaissance camera.

Such a directionally adjustable telescope arrangement is disclosed in European patent publication 0,385,079. This telescope arrangement is provided for use in a track vehicle and is a mirror telescope according to Cassegrain having a Nasmyth arrangement wherein a central bore of the main mirror is avoided in that a planar mirror deflects the beam by 90° forward of the main mirror, that is, before a first arcuate mirror.

In this known telescope arrangement, the second arcuate mirror is configured as a convex mirror and, to change the field of view, the second arcuate mirror can be exchanged for another convex mirror. In this way,. this telescope arrangement, which only has two imaging-effective arcuate mirrors, has either a field of view of 1° or a field of view of 3°.

SUMMARY OF THE INVENTION

It is an object of the invention to provide an improved directionally adjustable telescope arrangement having a high light intensity and a large field of view.

The directionally adjustable telescope arrangement of the invention includes: a first arcuate mirror for receiving an incoming beam traveling along a sight line of the telescope arrangement and for deflecting the beam along an imaging beam path; a second arcuate mirror arranged in the imaging beam path for receiving and deflecting the beam and the imaging beam path; a planar deflecting mirror for receiving and deflecting the beam and imaging beam path deflected from the second arcuate mirror; a third arcuate mirror arranged in the imaging beam path; and, the first, second and third arcuate mirrors conjointly effecting an imaging of the beam along the imaging beam path.

With the three optically-effective arcuate mirrors, a large light intensity and a large field of view (for example, up to 15° field of view diameter) are possible with an improved correctibility of the imaging errors.

Especially directionally adjustable telescope arrangements having a large field of view and/or a high light intensity basically require a large input pupil and this requires a high primary aperture ratio of the main mirror (that is, the first arcuate mirror) and considerable readjustment of magnification via the additional optically active elements. For these reasons, an optimal correctibility of the imaging errors by means of the at least three aspherically configurable surfaces is of great significance.

In an advantageous embodiment of the invention, the first arcuate mirror and the second arcuate mirror are mounted inclined relative to the viewing direction of the telescope arrangement and the second arcuate mirror lies outside of the beam path extending from the input end to the first arcuate mirror. In this way, shading by the second arcuate mirror and, possibly, the planar deflecting mirror, which is considerable especially for light intense Cassegrain telescope arrangements, can be avoided. The shading reduces the light intensity as well as the imaging quality. Furthermore, the planar deflecting mirror can in this way be so mounted that it is no longer surrounded by the imaging beam whereby, for a motorized rotatable deflecting mirror, the design requirements as to the drive are considerably reduced and this has very positive effects on the sensitivity and the accuracy of the drive and thereby also on the imaging quality.

In the event that the telescope arrangement has a detector housing and a viewing head, which is pivotable about a directional axis and accommodates the first arcuate mirror and the second arcuate mirror, then the directional adjustment range of the telescope arrangement can be especially great. For a viewing head, which is configured as a rotatable sphere having its own window, a directional adjustment range of plus/minus 140° referred to a longitudinal axis of the telescope arrangement can be achieved which, in the case of an aerial image camera, would correspond to the direction of flight. However, even for a viewing window which is mounted fixedly to the detector housing, a large directional angle is obtained with this embodiment.

BRIEF DESCRIPTION OF THE DRAWINGS

The invention will now be described with reference to the drawings where.

FIG. is a schematic section view of a first embodiment of the telescope arrangement according to the invention.

DESCRIPTION OF THE PREFERRED EMBODIMENTS OF THE INVENTION

Figure 1:
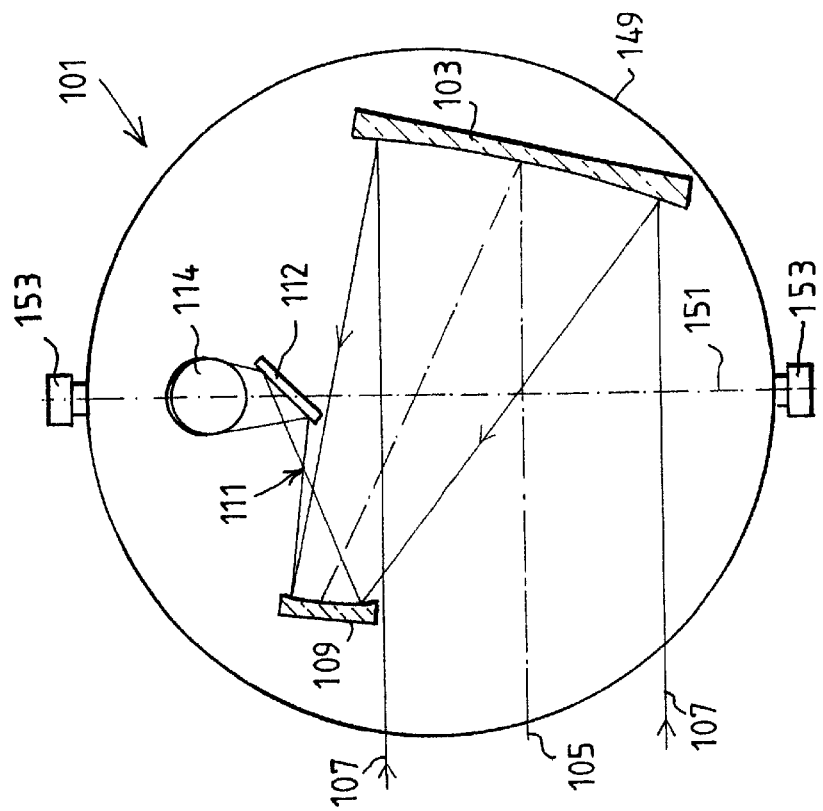
Figure 2:
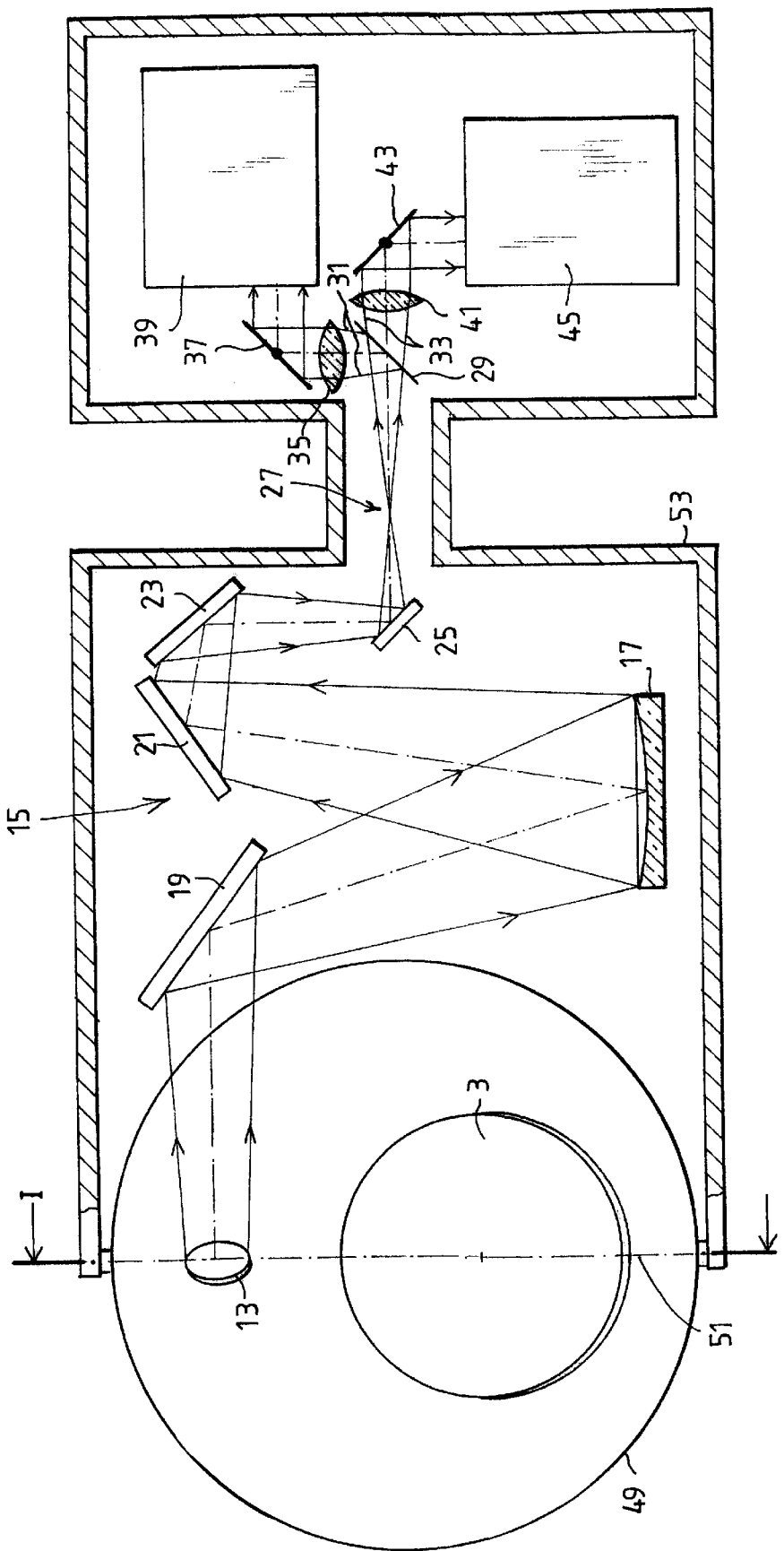
FIG. 2 is a section view of the telescope arrangement of FIG. 1 taken along line II—II of FIG. 1.

FIG. 1 shows a telescope arrangement 1 according to the invention in a front view shown in axial longitudinal section and FIG. 2 shows the telescope arrangement 1 in a side elevation section view taken along lines II—II of FIG. 1.

The telescope arrangement 1 includes a first arcuate mirror 3 which collects the rays of a beam 7 impinging thereon along a sight line 5 and deflects the beam to a second arcuate mirror 9. The second arcuate mirror 9 deflects the parallel beam 7 via an intermediate focus or an intermediate image 11 onto a planar deflecting mirror 13 which transmits the beam 7 orthogonally to the plane of the paper of FIG. 1 to a transmitting system 15 which can be seen in FIG. 2.

The transmitting system 15 includes a large aspherical arcuate mirror 17 and planar mirrors 19, 21, 23 and 25. With the transmission system 15, the intermediate image 11 is transmitted to a further focus or intermediate image 27. An adaptation to mounting conditions pregiven externally can be achieved with planar mirrors 19, 21, 23 and 25.

After the intermediate image 27, the beam 7 is divided by a dichroic beam splitter 29 into an infrared component 31 and a visible component 33. The infrared component 31 is guided by a refractive optic 35 and deflected via a pivotable mirror 37 to an infrared camera unit 39. The visible component 33 of the beam is guided by a refractive optic 41 and deflected via a pivotable deflecting mirror 43 to a camera unit 45 detecting visible light. The pivotable deflecting mirrors 37 and 43 can serve for scanning the image field as well as for compensating for image migration in the event that the telescope arrangement is utilized on a movable telescope carrier, for example, a reconnaissance aircraft.

The first arcuate mirror 3 and the second arcuate mirror 9 are mounted inclined relative to the sight line 5 or to an extension 47 of the sight line between mirror 3 and mirror 9. The second arcuate mirror 9 is mounted outside of the beam path of beam 7 which runs up to the first arcuate mirror 3. With this inclined and asymmetrical arrangement of the mirrors 3 and 9, a shading-free inclined mirror system is realized.

The arcuate mirrors 3 and 9 are accommodated in a viewing head 49 and are, together with viewing head 49, pivotable about a directional axis 51. The transmitting system 15, together with the downstream detector optic, is arranged in a detector housing 53 (shown schematically) which extends substantially transversely to the directional axis 51. The planar deflecting mirror 13 follows a pivot movement of the viewing head 49 about the directional axis 51 with half the angular velocity, that is, with a pivoting of the viewing head 49 about an angle a, the planar mirror 13 also has to be pivoted about the directional axis 51, but only by an angle α/2.

The directionally adjustable telescope arrangement 1 shown schematically in FIGS. 1 and 2 therefore includes an asymmetric arrangement of two imaging systems mounted one behind the other with a focus 11 therebetween. The first system is formed by the mirrors 3 and 9 and has a high light intensity and the second system includes the transmission system 15 with the arcuate mirror 17. With the telescope arrangement 1, all three arcuate mirrors 3, 9 and 17 can be used for correcting image aberrations especially because of their three fully aspherically correctable surfaces. In this way, the telescope arrangement 1 has a high light intensity and a large field of view within the corrected region. The optical assembly of the telescope arrangement 1 is especially suitable for focal lengths starting at approximately one meter upward and apertures above approximately 320 mm.

Figure 3:
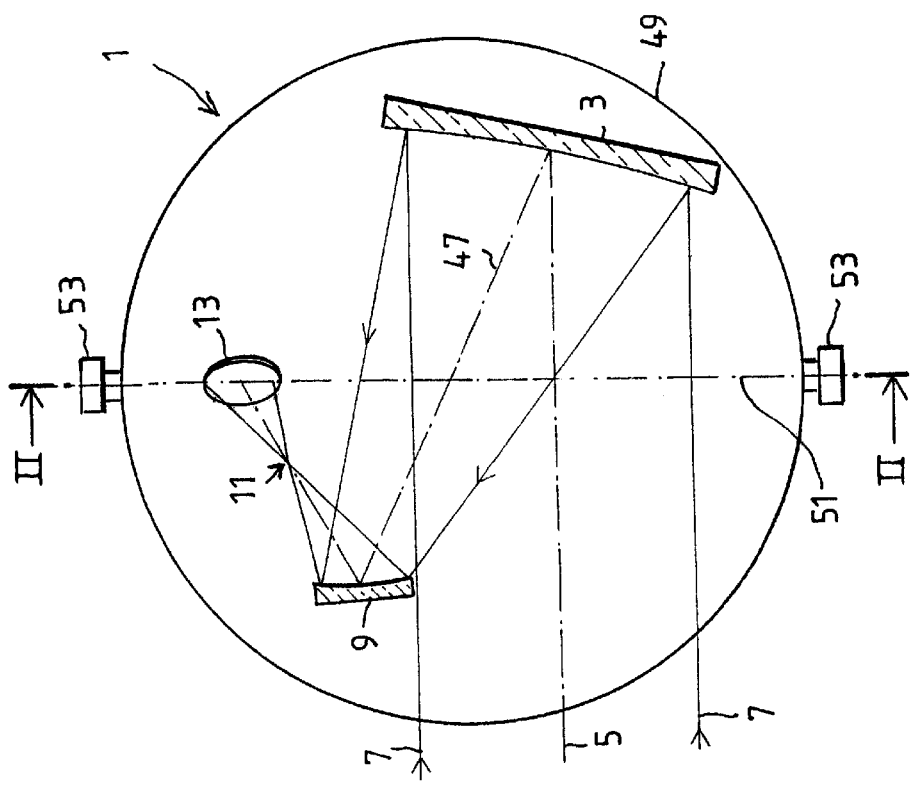
FIG. 3 is a schematic view of a second embodiment in a section view corresponding to the section view of FIG. 1.

FIG. 3 shows a view corresponding to FIG. 1 and is a further embodiment of the directionally adjustable telescope arrangement 101. The elements of the telescope arrangement 101 corresponding to those of telescope arrangement 1 are identified by the same reference numerals increased by 100. Reference can be made to the description of FIG. 1 for an explanation of these elements.

In contrast to the telescope arrangement 1, the telescope arrangement 101 includes a further planar deflecting mirror 114 in addition to planar deflecting mirror 112 between the second arcuate mirror 109 and the transmission system at the detector housing end. The two deflecting mirrors 112 and 114 are mounted in the region of the directional axis 151.

The deflecting mirror 114 is not pivoted along with a pivot movement of the viewing head 149 about the directional axis 151. The telescope arrangement 101 therefore has a periscope-like configuration. The design simplification caused thereby compared to telescope arrangement 1 is, however, achieved with an image rotation and this image rotation then has to be eliminated in the region of the transmission system and the camera instrumentation of the telescope arrangement 101.

The third arcuate mirror of the telescope arrangement 101 is mounted in the transmission system at the detector housing end in the same manner as for the telescope arrangement 1 and can therefore not be seen in FIG. 3.

Figure 4:
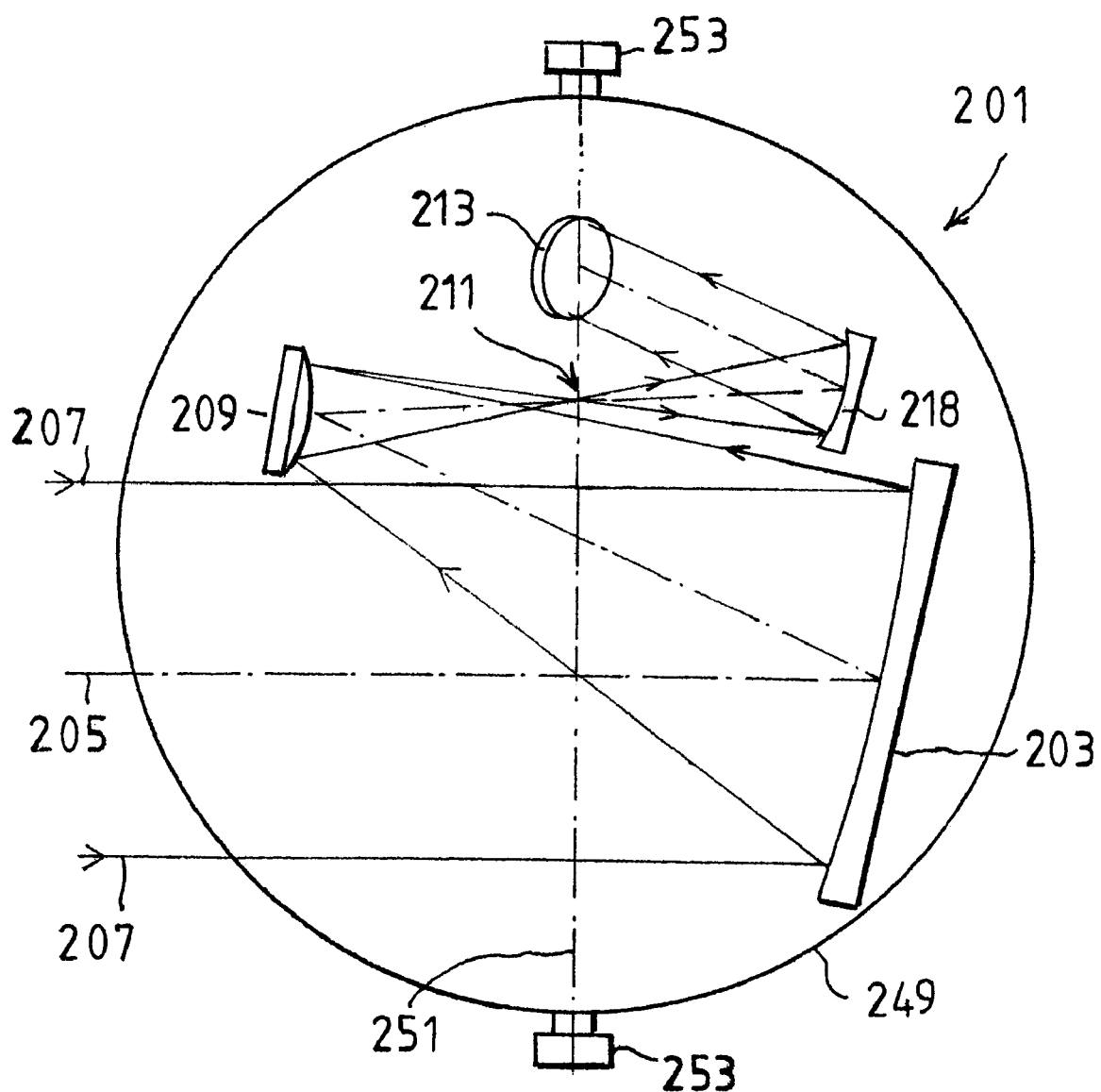
FIG. 4 is a schematic representation of a third embodiment of the invention in a view corresponding to FIGS. 1 and 3.

FIG. 4 shows a telescope arrangement 201 which is a further embodiment of the invention. The elements of the telescope arrangement 201 correspond to the elements of the telescope arrangement 1 and therefore have the same reference numerals increased by 200.

The telescope arrangement 201 includes a fourth arcuate mirror 218 in addition to the third arcuate mirror mounted in the transmission system of the telescope arrangement 201. This fourth arcuate mirror 218 reflects the beam 207 from the second arcuate mirror 209 to the planar deflecting mirror 213. In the same manner as the deflecting mirror 13 of the telescope arrangement 1, the planar deflecting mirror 213 follows a pivot movement of the viewing head 249 about the directional axis 251 at one half the angular speed.

A fourth embodiment of the telescope arrangement is shown schematically in FIGS. 5 to 8.

Figure 5:
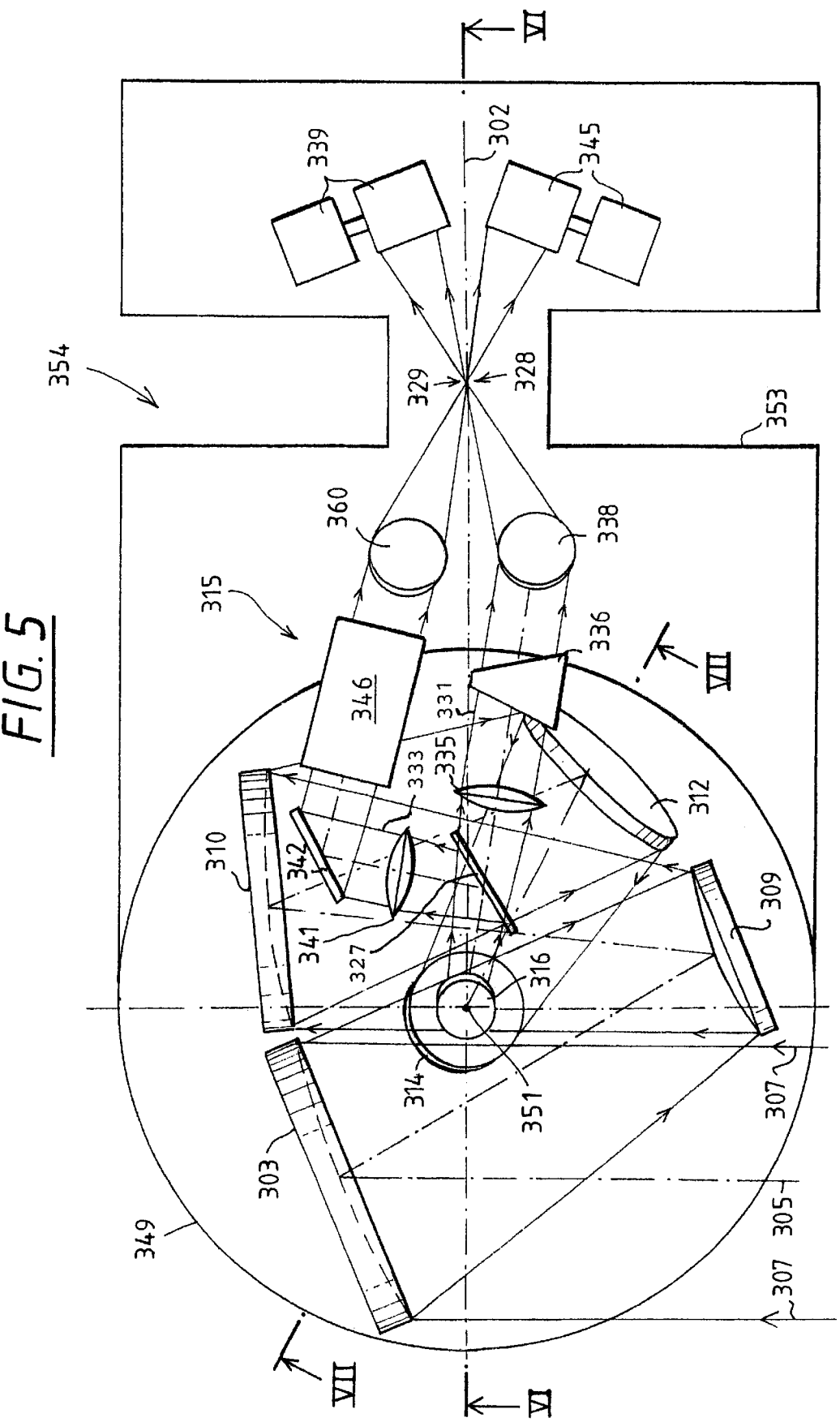
FIG. 5 is a schematic section view of a fourth embodiment.
Figure 6:
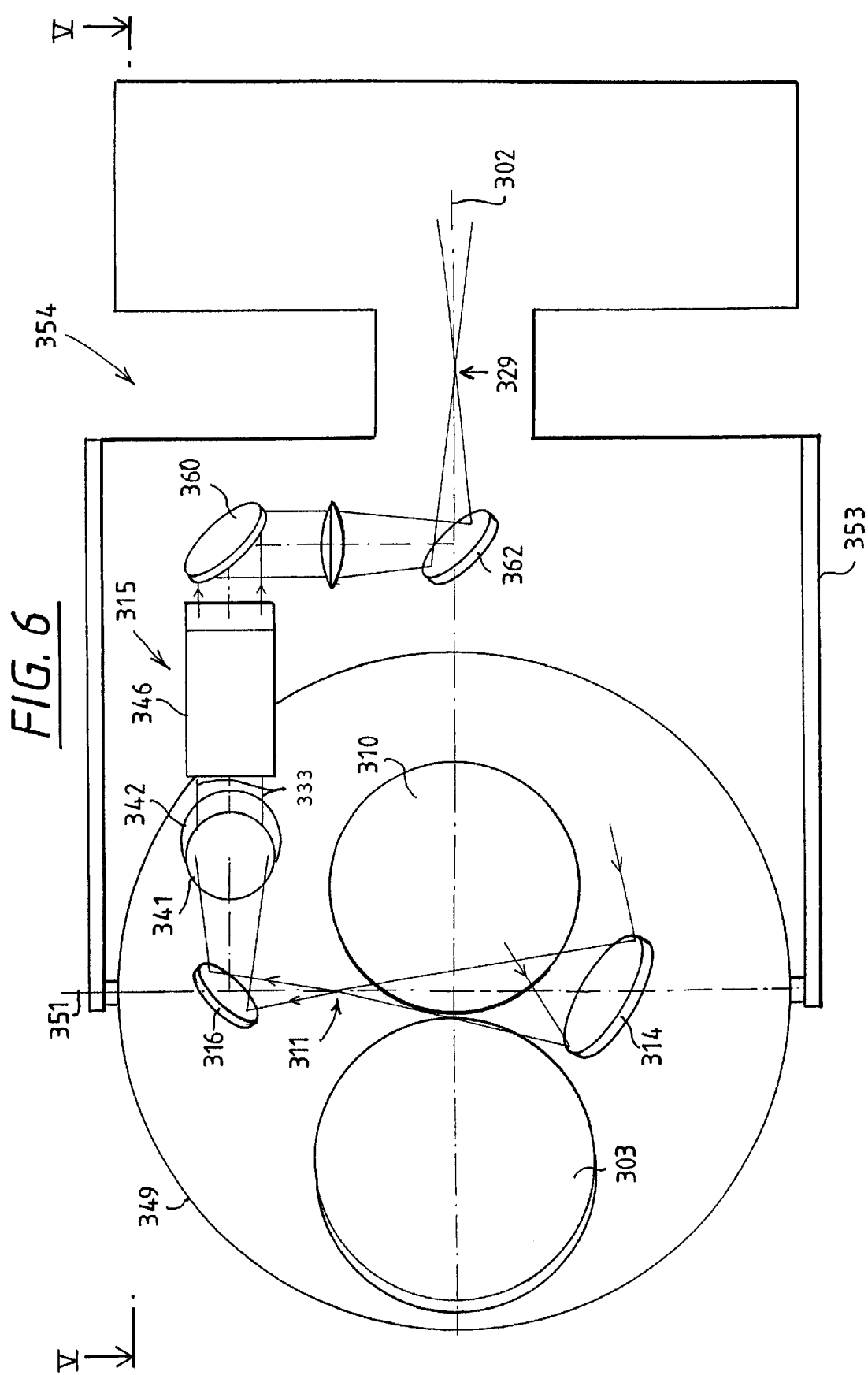
FIG. 6 shows the fourth embodiment in a section view taken along line VI—VI of FIG. 5.

The viewing head 349 is shown in section in FIG. 5 and is pivotable about a directional axis 351 orthogonal to the plane of FIG. 5. In FIG. 6, the viewing head 349 can be seen in a side elevation view. Here, the terms "plan view" and "side elevation view" refer to preferred embodiments of the telescope arrangement according to the invention for a side view from an aircraft. The directional axis 351 is essentially orthogonal to the direction of flight and the longitudinal axis 302 of the detector housing 353 is arranged essentially parallel to the direction of flight.

The telescope arrangement 301 includes a first arcuate mirror 303 which is configured as a concave mirror. The mirror 303 concentrates a beam 307, which incidents along a sight line 305, on a second arcuate mirror 309 configured as a convex mirror. A third arcuate mirror 310 is configured as a concave mirror and is mounted downstream of the second arcuate mirror 309 in the imaging beam path.

The imaging beam path runs from the concave mirror 310 to a planar deflecting mirror 312 and runs from the latter to a further deflecting mirror 314.

In FIG. 6, it can be seen that the imaging beam path is deflected by the planar deflecting mirror 314 to a third planar deflecting mirror 316. Furthermore, it can be seen that a focus or intermediate image 311 occurs between the planar deflecting mirrors 314 and 316 and that the planar mirrors 314 and 316 are mounted in the area of the directional axis 351. The planar mirrors 314 and 312 as well as the arcuate mirrors 303, 309 and 310 together with the viewing head 349 are pivotable about the directional axis 351; whereas, the planar mirror 316 does not follow a pivotal movement of the viewing head; instead, the planar mirror 316 always assumes the same orientation and position relative to the detector housing 353.

The section line taken along line VII—VII of FIG. 5 is rotated by an angle of 30° relative to the longitudinal axis 302 of the detector housing. The orientations of the planar deflecting mirrors 312, 314 and 316 can be seen in FIGS. 6 and 7.

Figure 7:
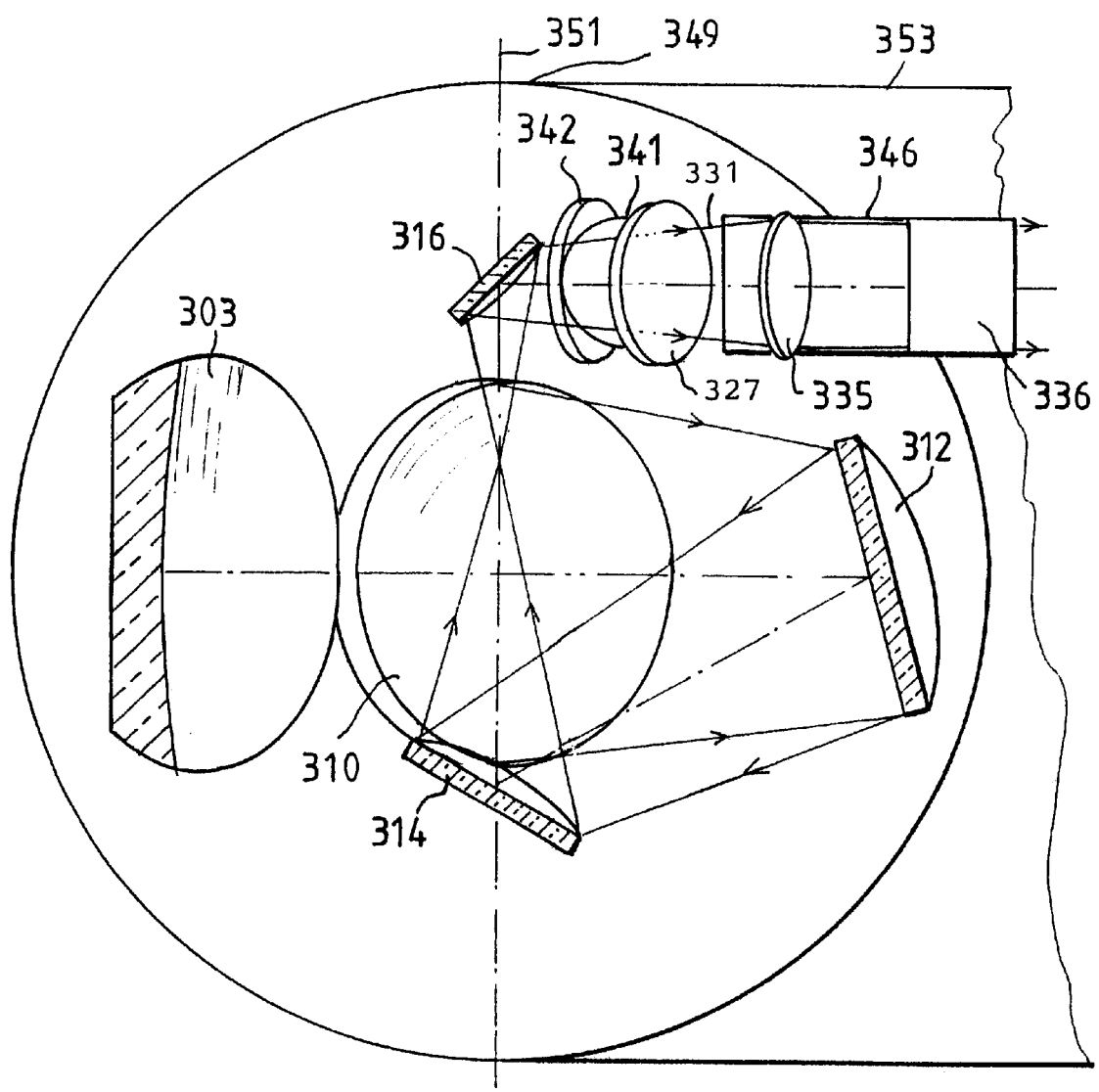
FIG. 7 shows the fourth embodiment as seen in a section view taken along line VII—VII of FIG. 5.

In FIGS. 5 to 7, the transmission system 315 of the telescope arrangement 301 is also shown. The transmission system 315 is mounted in the detector housing 353, that is, stationary relative to the detector housing 353.

The imaging beam coming from the planar deflecting mirror 316 is split by the dichroic beam splitter 327 into an infrared component 331 and a visible component 333. The infrared component 331 is guided via a refractive optic 335, an image erecting unit 336, a further planar deflecting mirror 338, while forming an intermediate focus or intermediate image 328, to a detector unit 339. The image erecting unit 336 is configured as a Dove prism or Taylor prism and the detector unit 339 includes a pivotable deflecting mirror and an infrared camera. The detector unit 339 corresponds essentially to the detector unit described in connection with FIG. 2.

In a similar manner, the visible beam 333 is guided via a schematically shown refractive optic 341, a deflecting element 342, an image erecting unit 346 as well as planar deflecting mirrors 360 and 362 to a detector unit 345. An intermediate focus or intermediate image 329 is formed in the beam path of the visible beam 333. The intermediate image 329 lies in the region of the longitudinal axis 302 of the detector housing 353 as does the intermediate image 328.

In the transmission system 315, the beam splitting therefore takes place in a region of the imaging beam path with a diverging beam. The region of the imaging beam path with a parallel light beam downstream of the beam splitter 327 is utilized for image inversion. The transmission system 315 makes possible the transmission of the intermediate image 311 to the intermediate images 328 and 329 with mutually crossing optical channels. A region 354 of the detector housing 353 tapers because of the positioning of the telescope arrangement and does not have to be expanded.

The optical assembly of the telescope arrangement 301 is especially suited for focal lengths less than approximately one meter and fields of view in the range of 2° to 5° or even beyond this range.

Figure 8:
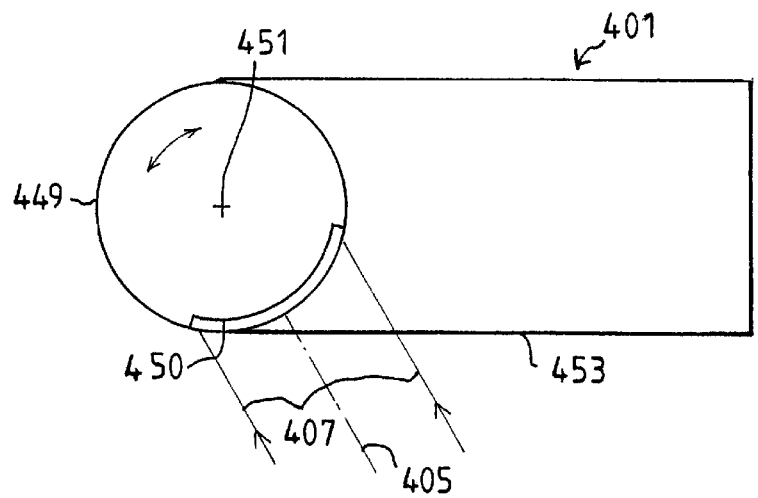
FIG. 8 is an embodiment of the telescope arrangement having a viewing window which is entrained by the pivotable viewing head.

FIG. 8 shows, in another embodiment of the invention, a telescope arrangement 401 having a viewing head 449 which is shown schematically and is rotatable about a directional axis 451 relative to a detector housing 453. The directional axis 451 is orthogonal to the plane of the drawing of FIG. 8. The viewing head 449 includes a spherical viewing window 450 which is pivotable therewith and through which a light beam 407 enters along the viewing direction 405.

Figure 9:
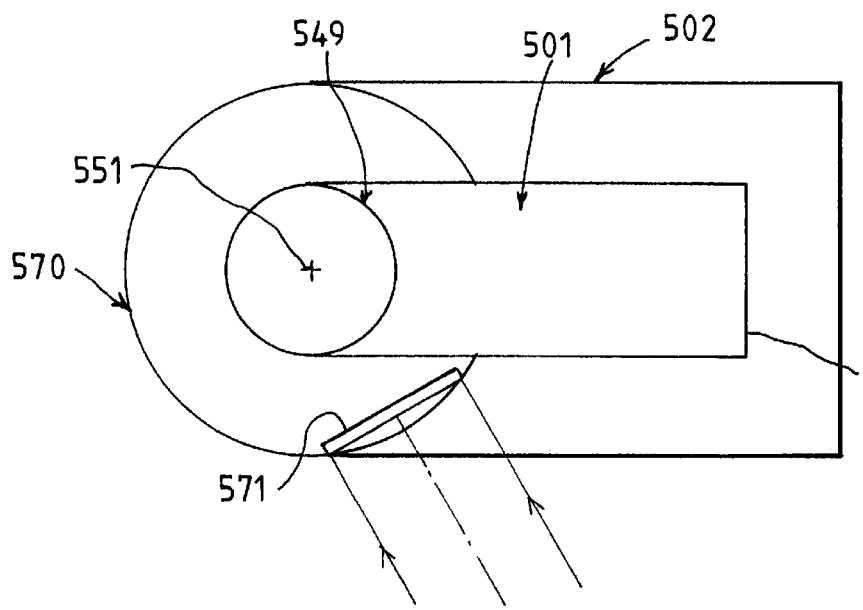
FIG. 9 shows the telescope arrangement in a telescope housing with an entrained viewing window; and, FIG. 10 is a telescope arrangement according to the invention in a telescope housing having a fixed viewing window.

In FIG. 9, a telescope arrangement 501 is shown schematically and is accommodated in a telescope carrier 502. The elements of FIG. 9 which correspond to those of FIG. 8 have the same reference numerals of those of FIG. 8 but increased by 100.

As shown, the telescope carrier 502 has a carrier hood 570 having a viewing window 571. The carrier hood 570 is pivoted separately about a directional axis 551. This decoupled arrangement of viewing head 549 and the downstream window 571 is especially favorable with respect to stabilization in view of the use of the telescope arrangement 501 as an aircraft supported reconnaissance camera. In this application, the telescope carrier 502 is mounted in a so-called pod on the rearward portion of the carrying aircraft.

Figure 10:
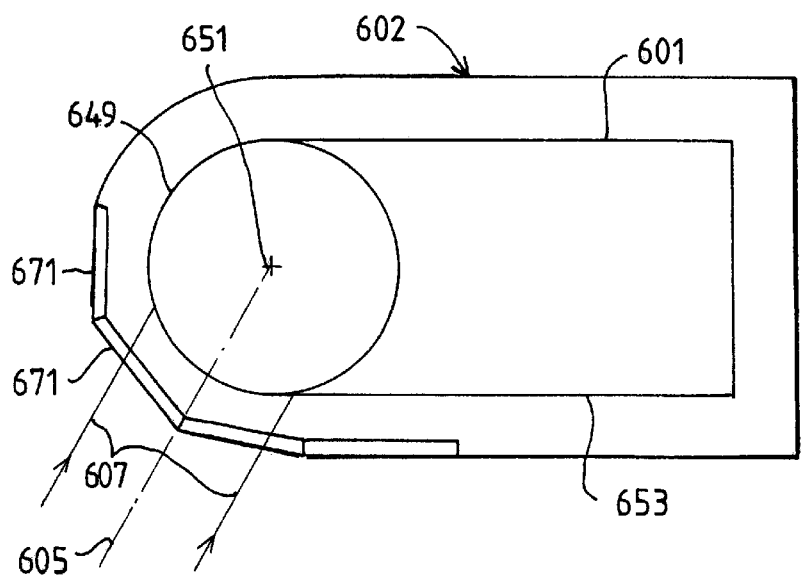

FIG. 10 shows a telescope arrangement 601 in a telescope carrier 602 which has a fixed viewing window 671. The elements of FIG. 10 which correspond to those of FIG. 8 have the same reference numerals increased by 200.

It is understood that the foregoing description is that of the preferred embodiments of the invention and that various changes and modifications may be made thereto without departing from the spirit and scope of the invention as defined in the appended claims.

What is claimed is:

1. A directionally adjustable telescope arrangement comprising:

a first arcuate mirror for receiving an incoming beam traveling along a sight line of said telescope arrangement and for deflecting said beam along an imaging beam path;

a second arcuate mirror arranged in said imaging beam path for receiving and deflecting said beam and said imaging beam path;

a planar deflecting mirror for receiving and deflecting the beam and imaging beam path deflected from said second arcuate mirror;

a third arcuate mirror arranged in said imaging beam path;

said first, second and third arcuate mirrors conjointly effecting an imaging of said beam along said imaging beam path;

a detector housing and a viewing head pivotally connected to said detector housing so as to be pivotable about a directional axis; and, said viewing head accommodating said first and second arcuate mirrors therein;

an image sensor mounted in said detector housing;

an ocular unit mounted forward of said image sensor; and, said ocular unit including a pivotally mounted deflecting mirror.

2. The directionally adjustable telescope arrangement of claim 1, wherein said intermediate image is a first intermediate image; and, wherein a second intermediate image is formed between said transmitting system and said image sensor.

3. A directionally adjustable telescope arrangement comprising:

a first arcuate mirror for receiving an incoming beam traveling along a sight line of said telescope arrangement and for deflecting said beam along an imaging beam path;

a second arcuate mirror arranged in said imaging beam path for receiving and deflecting said beam and said imaging beam path;

a planar deflecting mirror for receiving and deflecting the beam and imaging beam path deflected from said second arcuate mirror;

a third arcuate mirror arranged in said imaging beam path;

said first, second and third arcuate mirrors conjointly effecting an imaging of said beam along said imaging beam path;

a detector housing and a viewing head pivotally connected to said detector housing so as to be pivotable about a directional axis; and, said viewing head accommodating said first and second arcuate mirrors therein;

first and second electrooptical sensors mounted in said detector housing;

said first electrooptical sensor being for visible light and said second electrooptical sensor being for infrared light;

a first ocular unit having a first pivotally mounted deflecting mirror;

said first ocular unit being mounted upstream of said first electrooptical sensor;

a second ocular unit having a second pivotally mounted deflecting mirror; and, said second ocular unit being mounted upstream of said second electrooptical sensor.

4. A directionally adjustable telescope arrangement comprising:

a first arcuate mirror for receiving an incoming beam traveling along a sight line of said telescope arrangement and for deflecting said beam along an imaging beam path;

a second arcuate mirror arranged in said imaging beam path for receiving and deflecting said beam and said imaging beam path;

a planar deflecting mirror for receiving and deflecting the beam and imaging beam path deflected from said second arcuate mirror;

a third arcuate mirror arranged in said imaging beam path;

said first, second and third arcuate mirrors conjointly effecting an imaging of said beam along said imaging beam path;

said first and second arcuate mirrors being arranged inclined with respect to said sight line;

said first and second arcuate mirrors conjointly forming an intermediate image on said beam path; and, said first and second arcuate mirrors both having concave curved surfaces arranged asymmetrically with respect to each other.

* * * * *